United States Patent
Oya et al.

(10) Patent No.: US 9,652,699 B2
(45) Date of Patent: May 16, 2017

(54) IMAGE PROCESSING APPARATUS AND IMAGE PROCESSING METHOD

(71) Applicant: CANON KABUSHIKI KAISHA, Tokyo (JP)

(72) Inventors: Masashi Oya, Soka (JP); Naomi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/708,053

(22) Filed: May 8, 2015

(65) Prior Publication Data

US 2015/0332131 A1 Nov. 19, 2015

(30) Foreign Application Priority Data

May 14, 2014 (JP) .................................. 2014-100848

(51) Int. Cl.
| | |
|---|---|
| *H04N 1/60* | (2006.01) |
| *H04N 1/46* | (2006.01) |
| *G06K 15/02* | (2006.01) |
| *H04N 1/56* | (2006.01) |
| *G06K 15/00* | (2006.01) |
| *B41J 2/21* | (2006.01) |
| *H04N 1/54* | (2006.01) |

(52) U.S. Cl.
CPC ............ *G06K 15/1878* (2013.01); *B41J 2/21* (2013.01); *G06K 15/407* (2013.01); *H04N 1/54* (2013.01); *H04N 1/56* (2013.01); *G06K 2215/0094* (2013.01)

(58) Field of Classification Search
None
See application file for complete search history.

(56) References Cited

U.S. PATENT DOCUMENTS

| | | | | |
|---|---|---|---|---|
| 4,485,123 | A * | 11/1984 | Troue | G03F 7/2022 427/379 |
| 5,260,753 | A * | 11/1993 | Haneda | G03G 15/01 399/341 |
| 6,019,831 | A * | 2/2000 | Schmidt | C09B 67/0098 106/415 |
| 8,474,934 | B1 | 7/2013 | Curcio | |
| 2004/0131403 | A1* | 7/2004 | Nakamura | G03G 8/00 399/341 |

(Continued)

FOREIGN PATENT DOCUMENTS

| | | |
|---|---|---|
| CN | 101209630 A | 7/2008 |
| CN | 102256044 A | 11/2011 |

(Continued)

*Primary Examiner* — Madelein Nguyen
(74) *Attorney, Agent, or Firm* — Canon U.S.A., Inc. IP Division

(57) ABSTRACT

An image processing apparatus according to the present invention includes a setting unit configured to set whether execute gloss processing for reproducing a metallic luster is executed on a partial area of an image expressed by input image data, based on the input image data, and a recording unit configured to record on the partial area a color material corresponding to any of a complementary color of the partial area, black, and gray and to record thereon a color material for reproducing the color of the partial area in a case where a result of the setting unit indicates execution of the gloss processing.

14 Claims, 16 Drawing Sheets

(56) References Cited

U.S. PATENT DOCUMENTS

| | | | | |
|---|---|---|---|---|
| 2004/0169710 | A1* | 9/2004 | Ide | B41J 2/2114 347/101 |
| 2005/0041082 | A1* | 2/2005 | Kataoka | C09D 11/40 347/100 |
| 2007/0281177 | A1* | 12/2007 | Haubrich | B41M 3/148 428/457 |
| 2008/0158280 | A1 | 7/2008 | Imai | |
| 2009/0244118 | A1* | 10/2009 | Kakutani | B41J 2/2107 347/6 |
| 2010/0189477 | A1* | 7/2010 | Yamada | G03G 15/2064 399/329 |
| 2010/0226700 | A1* | 9/2010 | Yamada | G03G 15/2089 399/329 |
| 2010/0232846 | A1* | 9/2010 | Watanabe | G03G 15/2028 399/322 |
| 2010/0271411 | A1* | 10/2010 | Iritani | B41J 11/009 347/6 |
| 2010/0272458 | A1* | 10/2010 | Yoshikawa | G03G 15/6573 399/68 |
| 2011/0217100 | A1* | 9/2011 | Yoshikawa | G03G 15/2064 399/342 |
| 2011/0242176 | A1* | 10/2011 | Iritani | B41J 2/2114 347/15 |
| 2012/0050356 | A1* | 3/2012 | Seki | H04N 1/54 347/5 |
| 2012/0050362 | A1* | 3/2012 | Iritani | B41J 29/38 347/9 |
| 2012/0050369 | A1* | 3/2012 | Seki | B41J 2/2114 347/15 |
| 2012/0050370 | A1* | 3/2012 | Iritani | B41J 2/2132 347/15 |
| 2012/0229820 | A1 | 9/2012 | Koyatsu | |
| 2012/0237868 | A1* | 9/2012 | Yamada | G03G 9/0821 430/108.21 |
| 2012/0276293 | A1* | 11/2012 | Hirakawa | B41J 2/2114 427/258 |
| 2013/0265350 | A1* | 10/2013 | Costin, Sr. | B41J 3/42 347/2 |
| 2013/0300785 | A1* | 11/2013 | Tsuchiya | B41J 2/21 347/7 |
| 2013/0300788 | A1* | 11/2013 | Konno | B41J 2/2114 347/9 |
| 2013/0300790 | A1* | 11/2013 | Ojiro | H04N 1/4053 347/14 |
| 2013/0300791 | A1* | 11/2013 | Yazawa | H04N 1/54 347/15 |
| 2013/0301066 | A1* | 11/2013 | Ojiro | B41J 2/2114 358/1.9 |
| 2014/0205813 | A1* | 7/2014 | Torigoe | B44F 11/02 428/172 |
| 2015/0213342 | A1* | 7/2015 | Fukamachi | G06F 3/12 358/1.9 |

FOREIGN PATENT DOCUMENTS

| | | |
|---|---|---|
| CN | 102458860 A | 5/2012 |
| EP | 2381671 A2 | 10/2011 |
| JP | 03030576 B2 | 4/2000 |
| JP | 2005-336660 A | 12/2005 |
| JP | 2008-162095 A | 7/2008 |
| JP | 2013-168828 A | 8/2013 |
| KR | 10-2010-0007803 A | 1/2010 |

* cited by examiner

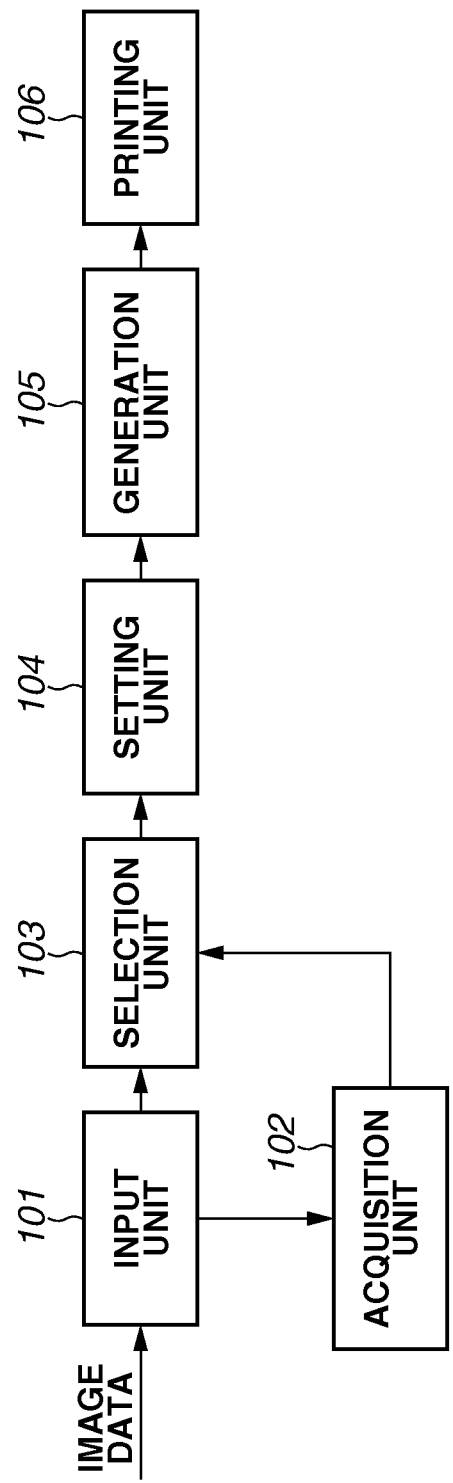

| 0 | 0 | 0 | 0 | 0 | 0 | 0 | 0 | 0 | 0 |
|---|---|---|---|---|---|---|---|---|---|
| 0 | 0 | 0 | 0 | 1 | 1 | 0 | 0 | 0 | 0 |
| 0 | 0 | 0 | 1 | 1 | 1 | 1 | 0 | 0 | 0 |
| 0 | 0 | 0 | 1 | 0 | 0 | 1 | 0 | 0 | 0 |
| 0 | 0 | 1 | 1 | 0 | 0 | 1 | 1 | 0 | 0 |
| 0 | 0 | 1 | 1 | 1 | 1 | 1 | 1 | 0 | 0 |
| 0 | 1 | 1 | 1 | 1 | 1 | 1 | 1 | 1 | 0 |
| 0 | 1 | 1 | 0 | 0 | 0 | 0 | 1 | 1 | 0 |
| 0 | 1 | 0 | 0 | 0 | 0 | 0 | 0 | 1 | 0 |
| 0 | 0 | 0 | 0 | 0 | 0 | 0 | 0 | 0 | 0 |

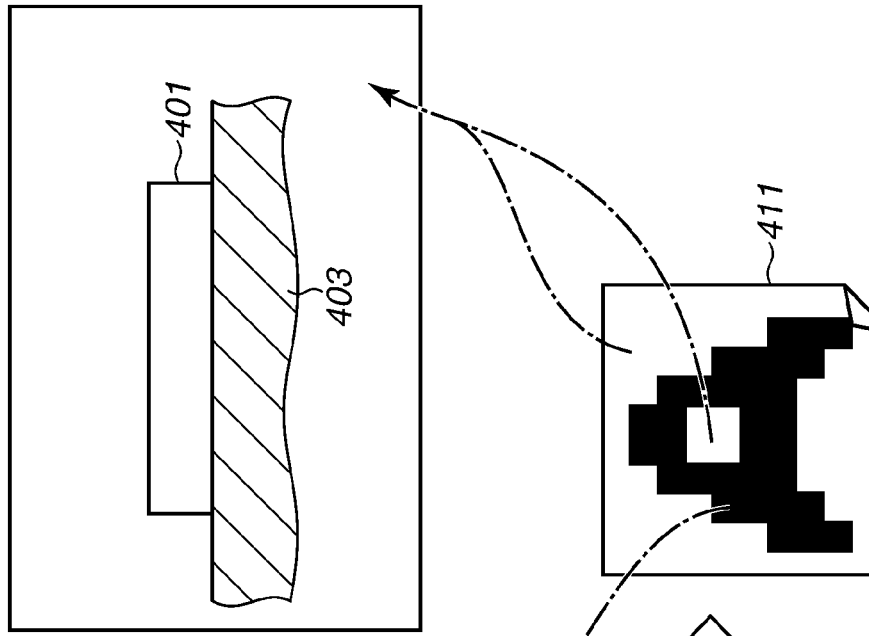
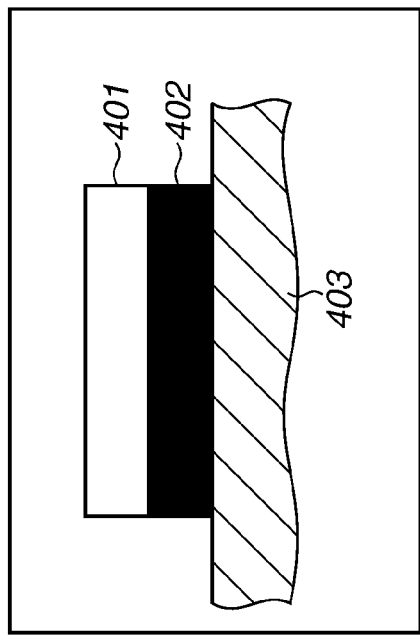
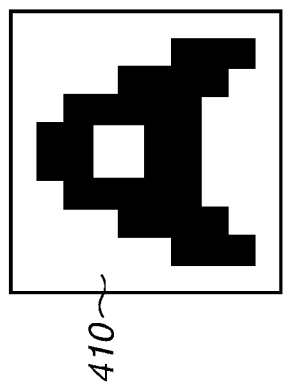

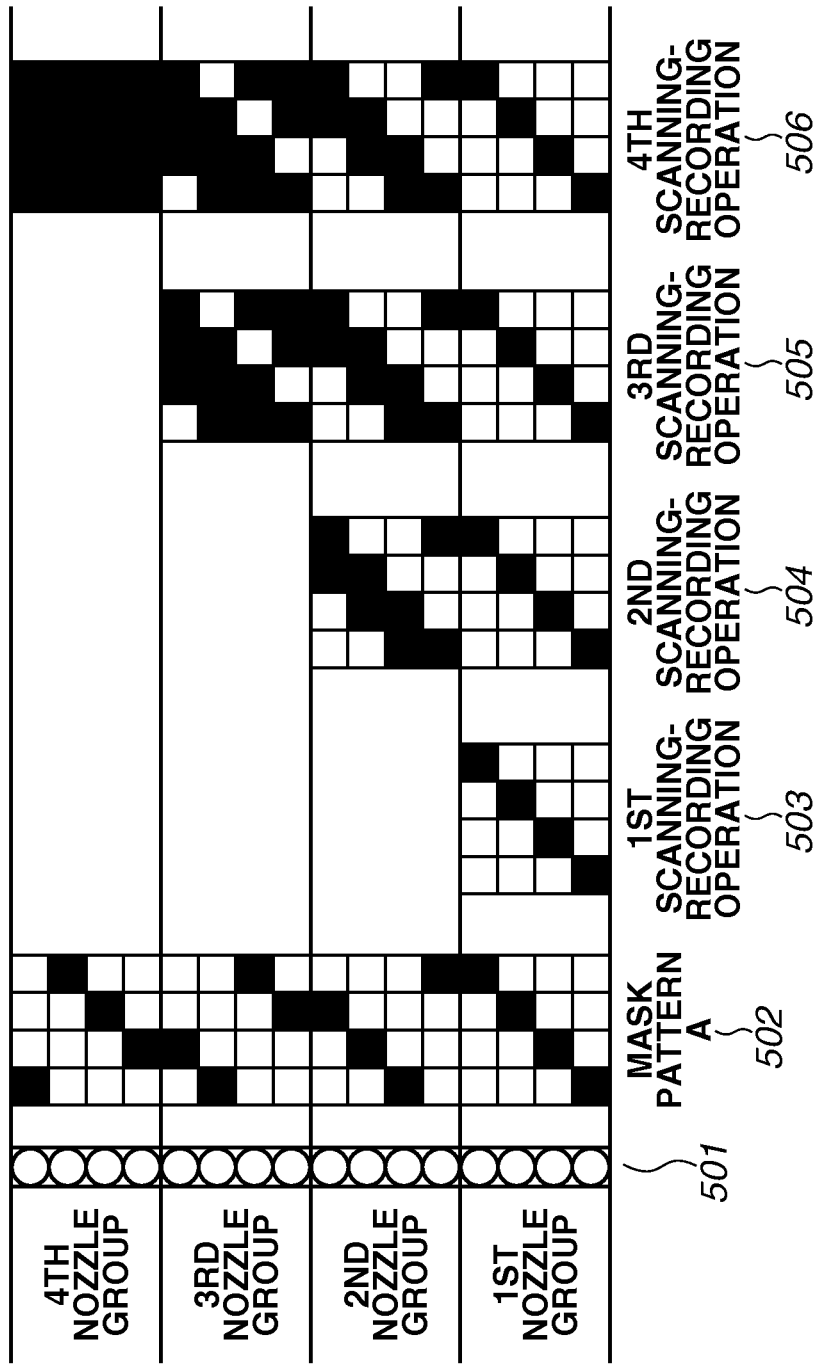

FIG.8A
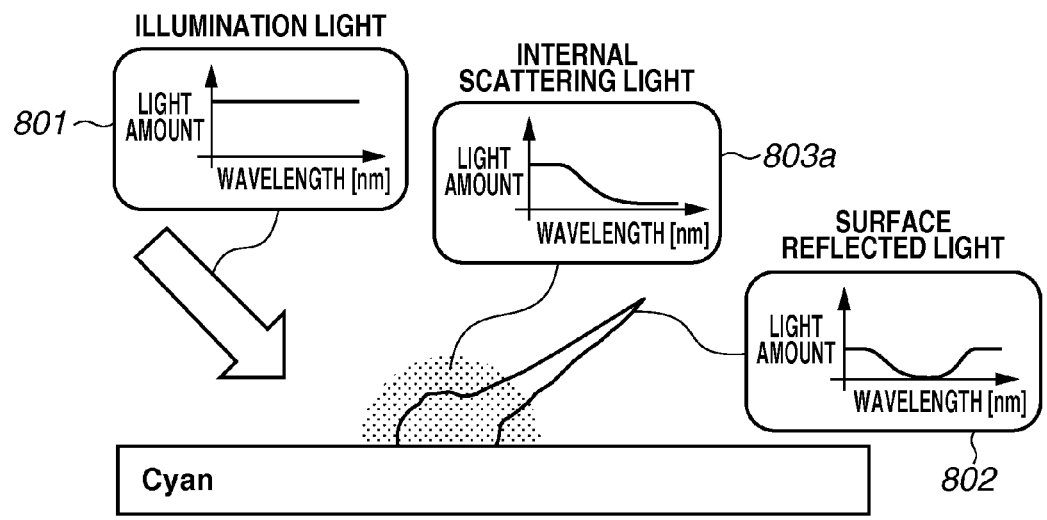
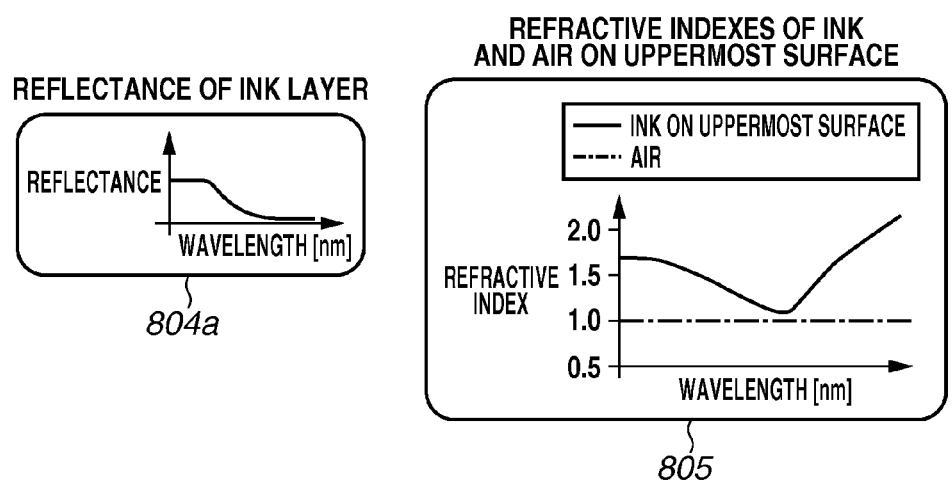

FIG.8B
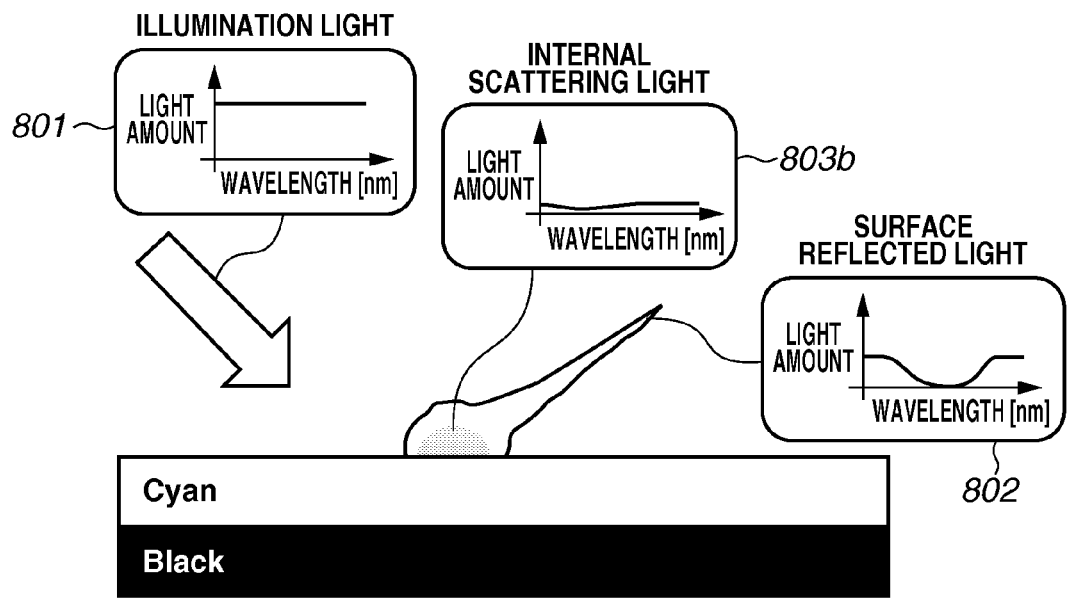
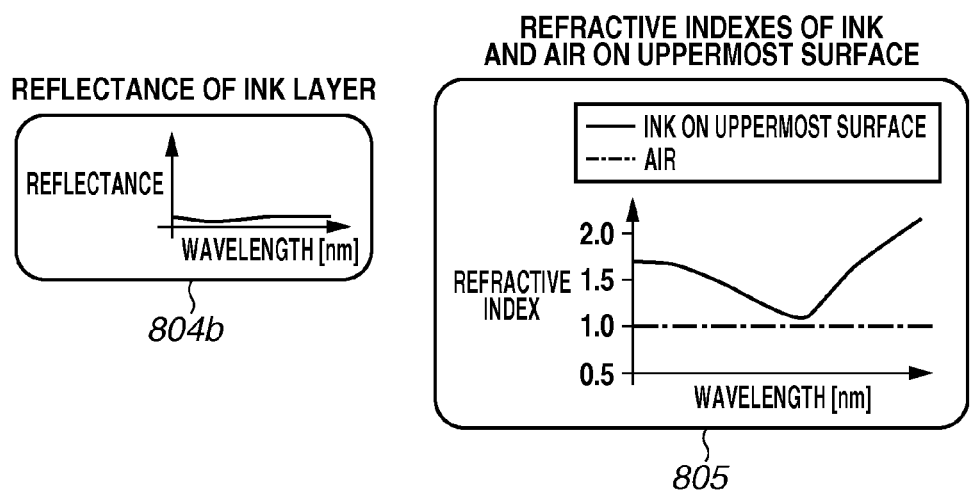

FIG.11A

| GLOSS FEATURE AMOUNT ||| RECORDING CONDITION ||||||
| | | | 1ST INK |||| 2ND INK |||
| INTENSITY | IMAGE CLARITY | HUE | SATURATION | INK TYPE | RECORDING AMOUNT | INK DOT LAYOUT | INK TYPE | RECORDING AMOUNT | INK DOT LAYOUT |
|---|---|---|---|---|---|---|---|---|---|
| 90 | 90 | 20 | 50 | C | 32 | DISPERSED | Bk | 128 | DISPERSED |
| 70 | 50 | 20 | 35 | C | 32 | CONCENTRATED | Bk | 128 | DISPERSED |
| 60 | 40 | 20 | 25 | C | 32 | DISPERSED | Bk | 128 | CONCENTRATED |
| 50 | 30 | 20 | 20 | C | 32 | CONCENTRATED | Bk | 128 | CONCENTRATED |
| 95 | 95 | 20 | 55 | C | 32 | DISPERSED | Gy | 196 | DISPERSED |
| ... | ... | ... | ... | ... | ... | ... | ... | ... | ... |
| 90 | 90 | 25 | 60 | C | 64 | DISPERSED | Bk | 128 | DISPERSED |
| ... | ... | ... | ... | ... | ... | ... | ... | ... | ... |
| 40 | 30 | 40 | 40 | Red | 32 | CONCENTRATED | Bk | 128 | CONCENTRATED |
| 50 | 40 | 35 | 30 | Red | 32 | DISPERSED | C | 196 | DISPERSED |
| ... | ... | ... | ... | ... | ... | ... | ... | ... | ... |
| 0 | 0 | 0 | 0 | — | — | — | — | — | — |

FIG.11B

| GLOSS FEATURE AMOUNT ||||| RECORDING CONDITION |||||||||
| INTENSITY | IMAGE CLARITY | HUE | SATURATION | 1ST INK |||||| 2ND INK |||
||||| PATTERN 1 ||| PATTERN 2 ||| | | |
||||| INK TYPE | RECORDING AMOUNT | INK DOT LAYOUT | INK TYPE | RECORDING AMOUNT | INK DOT LAYOUT | INK TYPE | RECORDING AMOUNT | INK DOT LAYOUT |
|---|---|---|---|---|---|---|---|---|---|---|---|---|
| 90 | 90 | 20 | 50 | C | 32 | DISPERSED | C | 32 | DISPERSED | Bk | 128 | DISPERSED |
| 80 | 70 | 20 | 40 | C | 32 | CONCENTRATED | C | 32 | DISPERSED | Bk | 128 | DISPERSED |
| 65 | 60 | 30 | 45 | C | 32 | DISPERSED | Red | 32 | DISPERSED | Bk | 128 | DISPERSED |
| 60 | 50 | 30 | 35 | C | 32 | DISPERSED | Red | 32 | CONCENTRATED | Bk | 128 | DISPERSED |
| --- | --- | --- | --- | --- | --- | --- | --- | --- | --- | --- | --- | --- |
| 90 | 80 | 60 | 50 | C | 64 | DISPERSED | Red | 32 | DISPERSED | Bk | 128 | DISPERSED |
| --- | --- | --- | --- | --- | --- | --- | --- | --- | --- | --- | --- | --- |
| 20 | 20 | 80 | 20 | Red | 32 | CONCENTRATED | Green | 32 | CONCENTRATED | Bk | 128 | CONCENTRATED |
| --- | --- | --- | --- | --- | --- | --- | --- | --- | --- | --- | --- | --- |
| 0 | 0 | 0 | 0 | — | — | — | — | — | — | — | — | — |

FIG.11C

| GLOSS FEATURE AMOUNT | RECORDING CONDITION ||||||
|---|---|---|---|---|---|---|
| | 1ST INK ||| 2ND INK |||
| MATERIAL | INK TYPE | RECORDING AMOUNT | INK DOT LAYOUT | INK TYPE | RECORDING AMOUNT | INK DOT LAYOUT |
| RED COPPER | C | 128 | DISPERSED | Bk | 128 | DISPERSED |
| GOLD | Red | 128 | DISPERSED | Bk | 128 | DISPERSED |
| COPPER | M | 128 | DISPERSED | Bk | 128 | DISPERSED |
| MATT GOLD | Red | 128 | CONCENTRATED | Bk | 128 | CONCENTRATED |
| ⋯ | — | ⋯ | ⋯ | ⋯ | ⋯ | ⋯ |
| NONE | — | — | — | — | — | — |

IMAGE PROCESSING APPARATUS AND IMAGE PROCESSING METHOD

BACKGROUND OF THE INVENTION

Field of the Invention

The present invention relates to image processing for recording an image expressing gloss on a recording medium by using a color material.

Description of the Related Art

There is provided a technique for providing an appearance that presents a glossy surface of a metal or a pearl on print products, such as a cosmetic package, a magazine, or a photo book.

For example, Japanese Patent Application Laid-Open No. 2005-336660 discusses a recording medium generation technique for realizing a metallic luster by applying a metallic foil on the surface of a recording medium. Further, Japanese Patent Application Laid-Open No. 2013-168828 discusses an image forming method for producing a printed material having a metallic luster appearance by using a special glossy material such as a metallic tone color material or a pearl tone color material including colorant containing metallic powder as a color material.

However, with the technique discussed in Japanese Patent Application Laid-Open No. 2005-336660, although the metallic luster can be applied to the entire surface of the recording medium, it is not possible to apply the metallic luster to only an arbitrary area. Further, with the technique discussed in Japanese Patent Application Laid-Open No. 2013-168828, although the metallic luster can be applied to only the arbitrary area, an image processing apparatus requires the special glossy materials in addition to regular color materials. Therefore, this may lead to an increase in size of the image processing apparatus and an increase in cost caused by the use of the special glossy materials. Furthermore, there may be a case where the user would like to reproduce the image placing emphasis on metallic luster even if the image processing apparatus is provided with the special glossy materials.

SUMMARY OF THE INVENTION

Therefore, the present invention is directed to an image processing apparatus capable of providing a printed material having a glossy surface appearance of a metal or a pearl on the arbitrary area without causing an increase in size of the image processing apparatus or an increase in cost caused by the use of special glossy materials. In addition, the present invention is directed to an image processing apparatus capable of reproducing an image placing emphasis on metallic luster by using a special glossy material.

According to the present invention, an image processing apparatus for forming an image by executing scanning-recording operations on a same area of a recording medium a plurality of times by using a same color material includes a setting unit configured to set whether gloss processing for reproducing a metallic gloss tone is executed on a partial area of an image expressed by input image data based on the input image data, and a recording unit configured to record on the partial area a color material corresponding to any of a complementary color of the partial area, black, or gray and to record thereon a color material for reproducing the color of the partial area in a case where a result of the setting unit indicates execution of the gloss processing.

Further features of the present invention will become apparent from the following description of exemplary embodiments with reference to the attached drawings.

BRIEF DESCRIPTION OF THE DRAWINGS

FIG. 1 is a diagram illustrating a configuration of an image processing apparatus according to a first exemplary embodiment.

FIGS. 4A and 4B are cross-sectional diagrams schematically illustrating a printed material made under a recording condition according to the present exemplary embodiment.

FIG. 5 is a diagram schematically illustrating a recording pattern according to the present exemplary embodiment.

FIGS. 8A and 8B are conceptual diagrams illustrating distribution of light amounts of illumination light, internal scattering light, and surface reflected light at respective wavelengths.

FIGS. 11A, 11B, and 11C are tables illustrating correspondence relationships between gloss data and recording conditions according to the second exemplary embodiment.

DESCRIPTION OF THE EMBODIMENTS

Figures 2A, 2B:
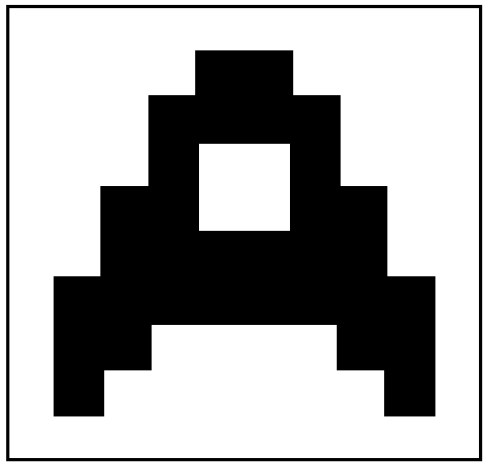
FIGS. 2A and 2B are schematic diagrams illustrating gloss data according to the first exemplary embodiment.

Hereinafter, an image processing according to an exemplary embodiment of the present invention will be described in detail with reference to the appended drawings. In addition, the same reference numerals are assigned to the configurations identical to each other.

Hereinafter, a first exemplary embodiment of the present invention will be described. In the present exemplary embodiment, print data for expressing a glossy surface is generated by determining a recoding condition of an ink based on received gloss feature amount data (hereinafter, also referred to as "gloss data"). The glossy surface includes a metallic luster and represents, for example, the appearance of a metal or a pearl. Further, the gloss data according to the present exemplary embodiment is binary data indicating whether the surface gloss tone is expressed at each predetermined area (e.g., either a pixel or an area of three-by-three pixels in length and width). For example, a value of the gloss data is set to 1 in a partial area on which the gloss processing for providing the glossy surface is executed, whereas the value is set to 0 in a partial area where the glossy surface is not expressed. FIG. 2 is a schematic diagram of the gloss data. For example, the gloss data is set as illustrated in FIG. 2B to produce a printed material having the glossy surface on the pattern illustrated in black in FIG. 2A. In addition, the values are not limited to the above example as long as the area can be divided into two areas, i.e., an area where the glossy surface is provided and an area where the glossy surface is not provided. For example, the value may be set to 0 in the area where the glossy surface is provided while the value is set to 1 in the area where the glossy surface is not provided. Further, a value of a flag representing the area is not limited to 0 or 1, and values from 0 to 255 or characters may be used therefor. Furthermore, the area is not limited to the above-described example, and an image object expressed by data may be regarded as the area.

According to the present exemplary embodiment, a recording condition determines whether an image is formed by recording the image with a second ink serving as a base color (i.e., a color material directly recorded on a recording medium 403) before recording the image with a first ink which is a chromatic color. In other words, a "gloss condition" refers to a recording condition where the first ink is applied after the second ink is applied to record an image, whereas recording conditions other than the gloss condition is referred to as a "non-gloss condition". FIGS. 4A and 4B are cross-sectional diagrams schematically illustrating differences in ink layers formed on a recording medium under the different recording conditions. FIG. 4A is an example of the cross-sectional surface of the ink layer under the gloss condition, whereas FIG. 4B is an example of the cross-sectional surface of the ink layer under the non-gloss condition. In FIG. 4B, although images are recorded with an ink under the non-gloss condition, the non-gloss condition also includes "paper white" in which no images are recorded on the recording medium. Under the gloss condition, a second ink 402 as a base color is applied to record an image before a first ink 401 is applied to the uppermost surface. For example, in a case where gloss data 410 of FIG. 4A is received and a printed material 411 of FIG. 4B is created, the area illustrated in white in the printed material 411 is recorded only with the first ink 401. Further, the area illustrated in black (i.e., a letter "A") is recorded with the second ink 402 and then the first ink 401 is applied to the second ink 402.

A mechanism for expressing the glossy surface on a printed material by forming the ink layer structure under the gloss condition will be described. When an observer observes the printed material under the illumination light, the eyes of the observer perceive two kinds of light such as surface reflected light reflected on a surface of the printed material and internal scattering light scattering inside the ink layers. In the present exemplary embodiment, the color of the surface reflected light is emphasized to realize the glossy surface by coloring the surface reflected light while reducing the amount of internal scattering light.

First, a method for controlling the coloring of the surface reflected light will be described. In the present exemplary embodiment, a bronzing phenomenon is used. The bronzing phenomenon can realize the surface reflected light having wavelength dispersion according to the characteristics of ink which is exposed on the surface of the printed material. For example, when the printed material is placed under the light source such as a spotlight, the surface reflected light is colored even though achromatic light is emitted from the light source. Such a phenomenon is known as "bronzing phenomenon". In particular, it is known that an area where cyan pigment ink is exposed on the surface thereof tends to have the surface reflected light colored in magenta. FIG. 8A is a schematic diagram illustrating light amount distributions of illumination light 801, internal scattering light 803a, and surface reflected light 802 at respective wavelengths when the cyan ink is irradiated with achromatic light emitted from the light source. Because the light amount distribution of the internal scattering light 803a is determined according to the reflectance of the cyan ink at each wavelength, the distribution of light amount is greater in the shorter wavelength. On the other hand, the light amount distribution of the surface reflected light 802 is determined according to a difference in refractive indexes between the ink accumulated on the uppermost surface and the air at each wavelength, so that the surface reflected light 802 has the light amount distribution with which the cyan ink is colored in magenta. In the present exemplary embodiment, the color of the surface reflected light 802 is controlled by controlling the amount of the ink exposed on the surface in order to use the bronzing phenomenon.

Next, a method for emphasizing the color of the surface reflected light which is generated from the bronzing phenomenon by reducing the light amount of the internal scattering light, is described below. To reduce the light amount of the internal scattering light, it is necessary to reduce the reflectance of the ink layer. FIG. 8B is a schematic diagram illustrating a state where the reflectance of the ink layer is lowered while the bronzing phenomenon is maintained. Reflectance of the ink layer represents an integrated value of the reflectance of the individual inks stacked in layers. Therefore, as illustrated in FIG. 8B, the reflectance of the ink layer is lowered while the difference in the refractive indexes between the ink and the air on the uppermost surface is maintained by laminating the cyan ink on top of the black ink that has a low reflectance across all wavelengths. As a result, the light amount of the internal scattering light is reduced. Because the internal scattering light is reduced, the color of the surface reflected light is emphasized. In other words, the surface reflected light is colored by controlling the color material exposed on the surface while the reflectance of the ink layer is controlled to reduce the light amount of the internal scattering light by using the second ink 402. In this manner, the glossy surface appearance of a metal or a pearl can be applied to the printed material. In the above embodiment, although the black ink, which has a low reflectance, is used as the second ink 402, the present exemplary embodiment is not limited to the above example. For example, ink in gray or a complementary color of the first ink 401 may be used as the second ink 402 as long as the reflectance or density of the ink layer can be lowered.

Next, processing for generating the print data for realizing the layer structures illustrated in FIGS. 4A and 4B will be described. FIG. 1 is a diagram illustrating a configuration of the image processing apparatus according to the present exemplary embodiment. The image processing apparatus includes a central processing unit (CPU), a read only memory (ROM), and a random access memory (RAM), each of which is not illustrated in FIG. 1. The CPU controls the entire image processing apparatus, while data is temporarily read or written from/into the RAM when the CPU executes calculation processing.

Figure 3:
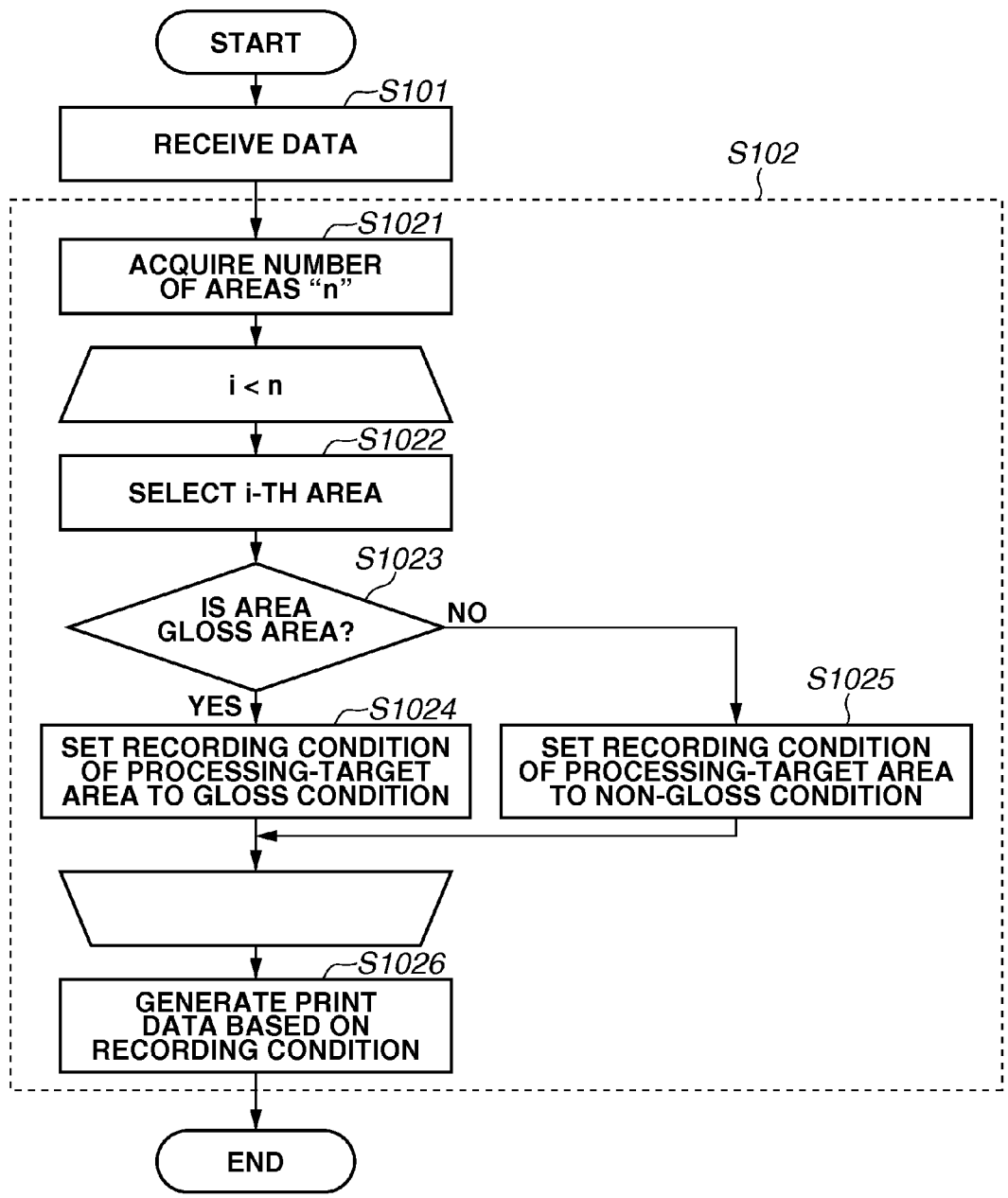
FIG. 3 is a flowchart illustrating processing for determining a recording condition according to the first exemplary embodiment.

FIG. 3 is a flowchart illustrating a processing flow of the image processing apparatus. In step S101, an input unit 101 receives the gloss data and image data such as a red-green-blue (RGB) image as input image data. The gloss data is input to the image processing apparatus after a user has edited or processed the gloss data with an external image editing apparatus (not illustrated). The gloss data may be input, separated from the image data, or may be input as attribute data of the image data. Further, an acquisition method of the input data is not limited to the above-described examples, and the image processing apparatus may acquire the data by reading the data stored in a memory. After the gloss data has been acquired, the processing proceeds to step S102.

In step S102, based on the input gloss data, the recording condition is set to each area and the print data is generated based on the recording condition set thereto. Details of the processing flow in step S102 is illustrated in FIG. 3.

In step S1021, an acquisition unit 102 acquires the number of pixels to which the input gloss data is applied as the number of areas "n" (n≥1). The number of areas "n" may be acquired from the attribute data of the input data, or may be acquired by calculating the number of areas. For example, in a case where the gloss data illustrated in FIG. 2B is received, the number of areas "n" is "n=100". After acquiring the number of areas "n", the processing in step S1022 to step S1024 is executed repeatedly n-times in order to determine the recording conditions with respect to all of the areas. In addition, the above processing may be executed in parallel instead of executing repeatedly.

In step S1022, the selection unit 103 selects a processing-target area. The processing-target area is selected according to the order recorded in the input gloss data. The processing target area may be selected in sequence. For example, pixels may be scanned and processed starting from the pixel at the upper left in FIG. 2B in the lateral direction. After the areas in the first row are processed, the areas in the second row are processed subsequently. In addition, a selection order of the processing target area is not limited to the above order, and the order thereof may be determined according to the environment where the processing according to the present exemplary embodiment is to be executed. After the processing-target area is selected, processing proceeds to step S1023.

In step S1023, the selection unit 103 determines whether the area selected as the processing-target area is a gloss area. Specifically, the selection unit 103 determines whether a value of the processing-target area selected in step S1022 is 1 or 0. In a case where the value is 1 (YES in step S1023), the selection unit 103 determines that the selected area is a gloss area, and the processing proceeds to step S1024. In a case where the value is 0 (NO in step S1023), the selection unit 103 determines that the selected area is a non-gloss area, and the processing proceeds to step S1025.

In step S1024, a setting unit 104 sets the recording condition of the processing-target area to the gloss condition. In step S1025, the setting unit 104 sets the recording condition of the processing-target area to the non-gloss condition. With the above-described processing, the glossy surface can be expressed without using a special gloss ink or a special recording medium. The setting unit 104 sends the recording conditions of respective areas set in steps S1024 and S1025 to the processing in step S1026.

In step S1026, a generation unit 105 generates the print data based on the recording conditions set in steps S1024 and S1025. In the present exemplary embodiment, the generated print data serves as the input data, and a printing unit 106 that records an image on the recording medium 403 is a multipath recording-system ink jet printer as an example of an image recording apparatus, which is described below. According to the present exemplary embodiment, the print data is used for determining whether the first ink 401 and the second ink 402 are discharged based on the recording condition of each area set by the above-described processing in steps S1024 and S1025. In addition, the format of the print data is not limited to the above format. The data format may be changed according to a recording system of the image recording apparatus. For example, the print data may be an on/off signal of an exposure laser beam if an electrophotographic system is employed for the image recording apparatus. Further, in addition to the features of the recording-target data, the print data may also include information of recording media, information of printing qualities, and control information of sheet-feeding methods based on the data separately input thereto. Next, an example of processing for generating the print data based on the recording condition will be described.

FIG. 5 is a diagram schematically illustrating a recording head and a recording pattern (i.e., mask pattern) to describe a multipath recording method. Generally, a recording head included in the ink-jet recording apparatus has several hundreds of nozzles. Herein, for the sake of simplicity, a recording head 501 includes sixteen nozzles. As illustrated in FIG. 5, the nozzles are divided into four nozzle groups, that is, the first to the fourth nozzle groups, and each of the nozzle groups includes four nozzles. In a mask pattern 502, areas where the nozzles execute recording operations are shown in black. Individual patterns recorded by each nozzle group are in a mutually complementary relationship, and thus the recording operation with respect to the area corresponding to a four-by-four area is completed when each of the recorded patterns overlaps each other. Each of patterns 503 to 506 illustrates how an image is completed as scanning-recording operations are repeatedly executed. The recording medium is conveyed in a vertical direction in FIG. 5, by the width of the nozzle group every time each of the scanning-recording operation is completed. Accordingly, an image in a same area on the recording medium (i.e., an area corresponding to the width of each nozzle group) is eventually completed by executing the scanning-recording operations four times. As described above, because a plurality of the nozzle groups executes a plurality of times scanning operations with respect to the same area on the recording medium, variation unique to the nozzle or variation in conveyance precision of the recording medium can be reduced.

Figure 6A:
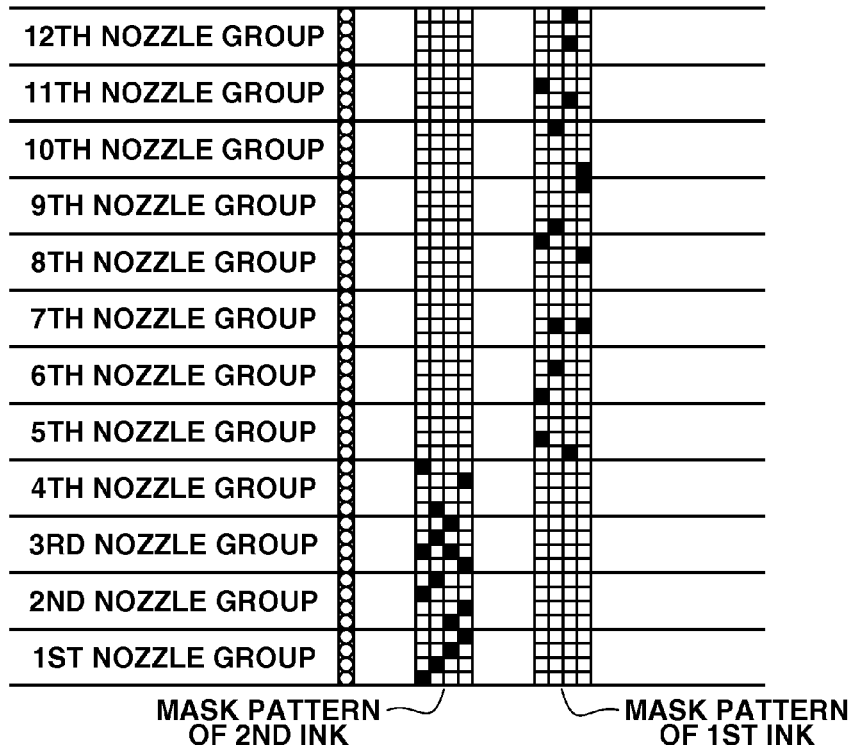
FIGS. 6A and 6B are examples of print data according to the present exemplary embodiment.
Figure 6B:
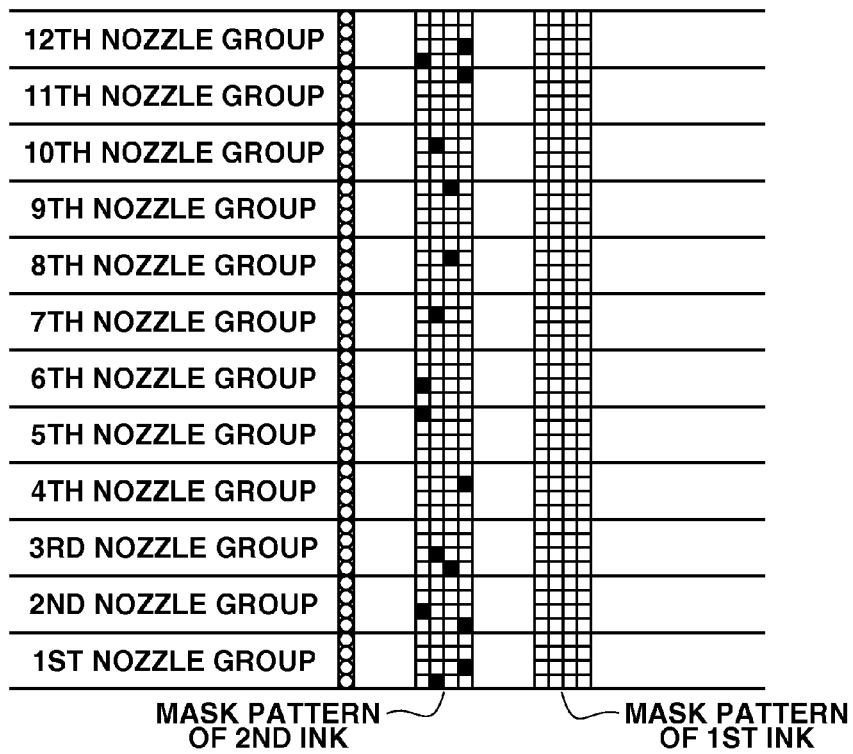

FIG. 6A is a diagram illustrating an example of the print data when the recording condition is the gloss condition, and FIG. 6B is a diagram illustrating an example of the print data when the recording condition is the non-gloss condition.

When the recording condition is the gloss condition, the second ink 402 is discharged as a base color through the first four scanning-recording operations, and the first ink 401 is discharged through the subsequent eight scanning-recording operations. In the above, the number of times of scanning-recording operations using the second ink 402 and the first ink 401 are four times and eight times respectively, although the above-described numbers of times are merely examples. For example, the scanning-recording operations using the second ink 402 and the first ink 401 may be equally executed six times respectively. Through the above-described scanning-recording operations, the ink layer structure with the gloss condition illustrated in FIG. 4A is recorded on the recording medium.

Further, when the recording condition is the non-gloss condition, the second ink 402 is discharged on the recording medium by executing twelve scanning-recording operations. Through the above-described scanning-recording operations, the ink layer structure under the non-gloss condition illustrated in FIG. 4B is recorded on the recording medium. As described above, the print data is generated based on the recording condition. Generation of the print data based on the recording condition is not limited to the above-described example. In the present exemplary embodiment, the print data is created by a dot pattern according to each scanning-recording operation. However, the dot pattern may be determined by a method known as "dithering method".

By realizing the above processing, print data for creating a printed material having a glossy surface only in the arbitrary area can be generated at a cost lower than a cost of the image processing using special glossy materials. In the present exemplary embodiment, a suitable example of the non-gloss condition in which the second ink 402 is recorded has been described. However, the present exemplary embodiment is not limited thereto. For example, the printing operation may not be executed under the non-gloss condition.

Hereinafter, a second exemplary embodiment of the present invention will be described. In the first exemplary embodiment, the print data is generated by determining the recording condition such as the gloss condition or the non-gloss condition based on the binary gloss data. In the present exemplary embodiment, the ink type more favorable for the first ink 401 is determined from among at least two or more colored inks and further an ink dot layout thereof is determined based on the gloss data indicating gloss intensity, gloss image clarity, gloss saturation, and gloss hue. By changing the ink type and the ink dot layout of the first ink 401, types of reproducible glossy surface can be increased. Hereinafter, a mechanism for increasing the types of reproducible glossy surface will be described with reference to a schematic diagram.

First, an example of using different types of the first ink 401 will be described with reference to FIG. 7. As described in the first exemplary embodiment, a reflected light amount at each wavelength of light 704 reflected on a surface is determined according to the refractive index at each wavelength of the first ink 401. Diagram 805 in FIG. 8B represents the refractive indexes of the first ink 401 and the air. Diagram 802 in FIG. 8B represents the reflected light amount of the light 704 reflected on the surface when the printed material is observed under an achromatic light source 701. An amount of the light 704 reflected on the surface is determined by the difference in the refractive indexes at the boundary surface between two substances. Accordingly, the amount of the light 704 reflected on the surface is greater in the wavelength having greater difference in the refractive indexes between the air and the first ink 401. Based on the above principle, wavelength distribution of the refractive index is changed by controlling the ink type of the first ink 401 so as to make the light 704 reflected on the surface have the color specified in the gloss data.

Figure 9A:
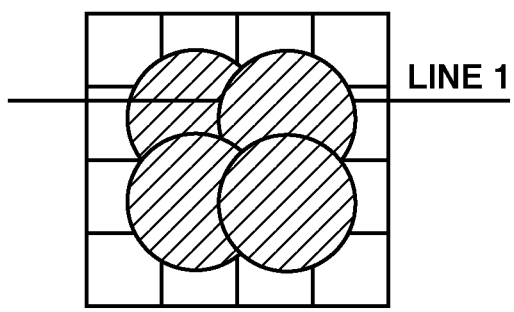
FIGS. 9A, 9B, 9C, and 9D are schematic diagrams illustrating differences in surface roughness of ink layers in different ink dot layouts.
Figure 9B:
Figure 9C:
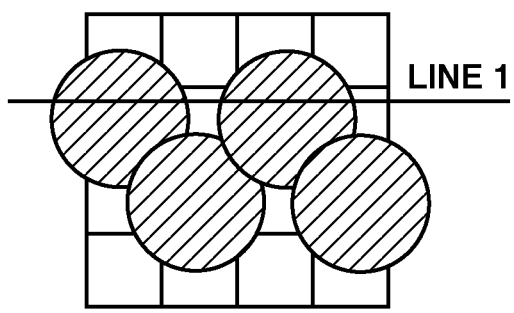
Figure 9D:

Next, an example of using different ink dot layouts for recording the first ink 401 will be described. Examples of discharging the ink dots on a four-by-four area based on the processing executed in step S1026 of the first exemplary embodiment is described below. FIGS. 9A to 9D are overhead views and cross-sectional views schematically illustrating four dots of ink recorded in different ink dot layouts. FIG. 9A is an overhead view of concentrated ink dots, and FIG. 9B is a cross-sectional view of the concentrated ink dots taken along a line 1 in FIG. 9A. On the contrary, FIG. 9C is an overhead view of dispersed ink dots, and FIG. 9D is a cross-sectional view of the dispersed ink dots taken along a line 1 in FIG. 9C. When the ink dots illustrated in FIGS. 9B and 9D are compared to each other, the ink layer has greater surface roughness in a concentrated ink dot layout, while the ink layer has less surface roughness in a dispersed ink dot layout. FIG. 7 is a diagram illustrating behavior of light when the surface roughness of the ink layer has less surface roughness, and FIG. 13 is a diagram illustrating behavior of light when the surface roughness of the ink layer has greater surface roughness.

Figure 7:
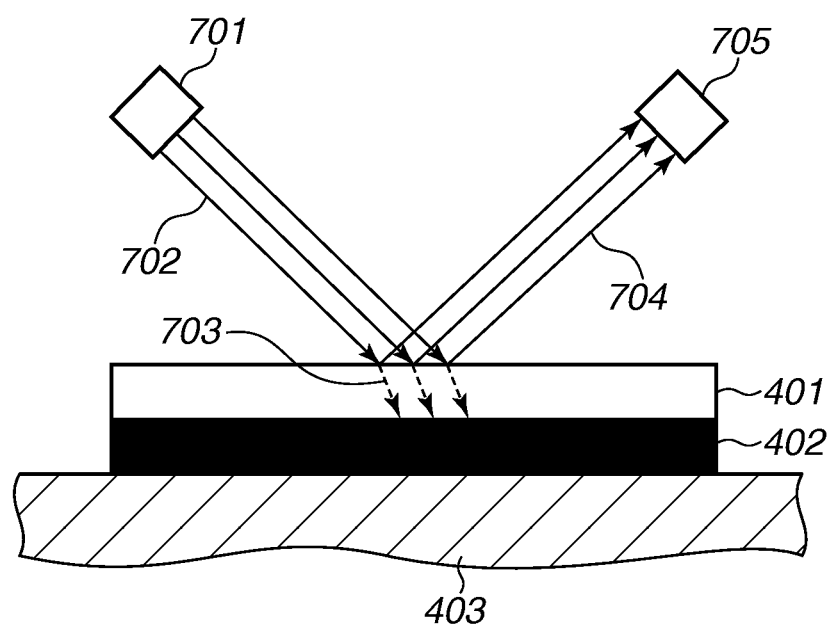
FIG. 7 is a cross-sectional diagram schematically illustrating behavior of light when the printed material recorded under the recording condition according to the first exemplary embodiment is observed.

FIG. 7 illustrates a state that a printed material where the second ink 402 and the first ink 401 are laminated on the recording medium 403 is irradiated with light 702 emitted from the illumination light 701, and an observer 705 receives the reflected light 704 and perceives the color. The light 702 emitted from the illumination light 701 is divided into the surface reflected light 704 reflected on the surface of the first ink 401 and the light 703 penetrating the inside of the first ink 401. Between the divided lights 704 and 703, the surface reflected light 704 directly travels toward the observer 705, whereas the light 703 penetrating the inside of the ink layer is absorbed into the ink layer.

Figure 13:
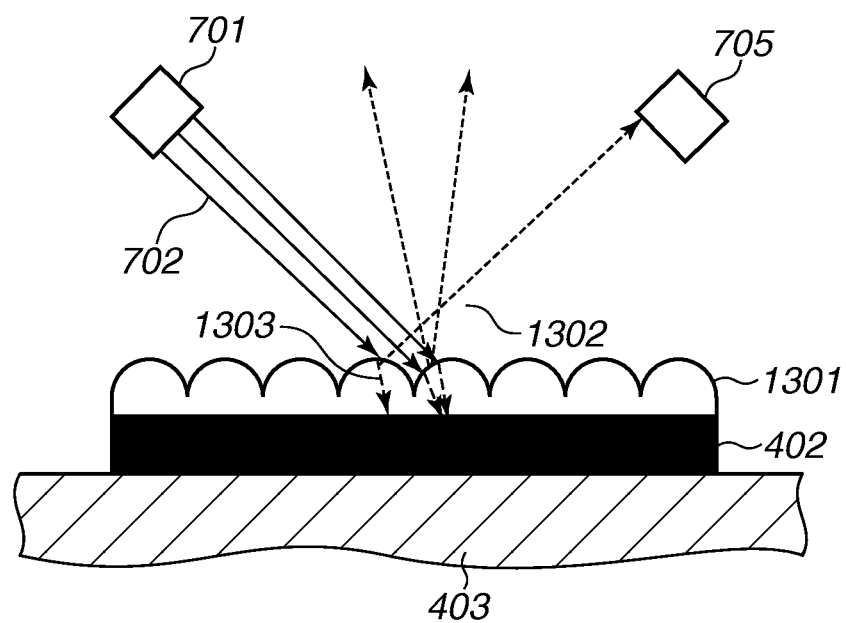
FIG. 13 is a cross-sectional diagram schematically illustrating behavior of light when the printed material recorded under the recording condition according to the second exemplary embodiment is observed.

On the contrary, as illustrated in FIG. 13, in a case where the surface roughness of a first ink layer 1301 is greater, light 1302 reflected on the surface and light 1303 penetrating the inside reflect in various directions because of the uneven surface. As a result, if the surface roughness is great as in the first ink layer 1301, the amount of light that reaches the observer 705 is small. In other words, controlling the ink dot layout of the first ink 401 can change the variation in layer thickness of the first ink 401, thereby controlling the color of the glossy surface. In the present exemplary embodiment, the ink dot layout of the first ink 401 on the uppermost surface is controlled. However, the exemplary embodiment is not limited to the above. For example, variation in the layer thickness of the first ink 401 recorded on the second ink 402 may be controlled by controlling the ink dot layout of the second ink 402.

As described above, distribution of the refractive index at each wavelength is changed according to the ink type, and the surface roughness of the ink layer is controlled by the ink dot layout. With this configuration, types of the reproducible glossy surface can be increased. In addition, in the present exemplary embodiment, the surface roughness of the ink layer is controlled by the ink dot layout. However, the exemplary embodiment is not limited to the above. The surface roughness of the ink layer may be controlled by the recording amount of ink or the number of times of scanning-recording operation.

Figure 10:
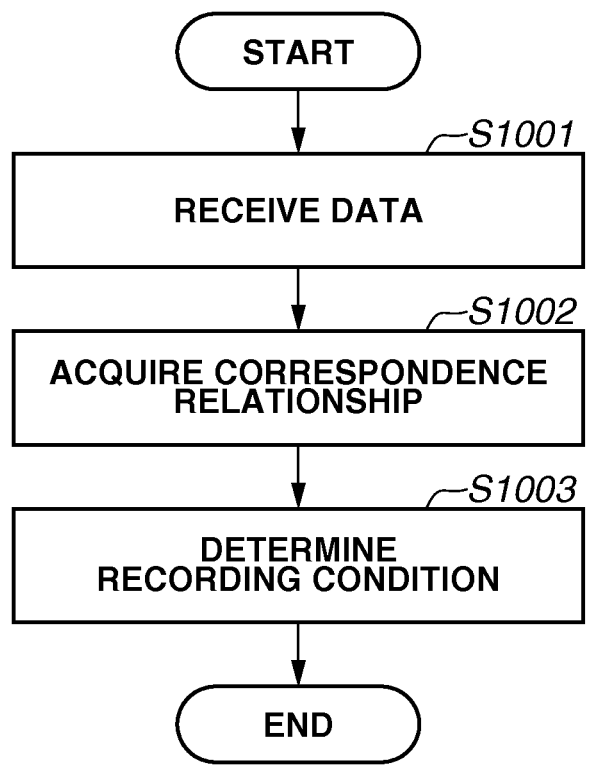
FIG. 10 is a flowchart illustrating processing for determining a recording condition according to a second exemplary embodiment.

Hereinafter, processing for generating the print data realizing the above-described control processing will be described in detail. FIG. 10 is a processing flow for generating the print data according to the present exemplary embodiment.

In step S1001, the gloss data is acquired as the input data, and the acquired data is sent to the subsequent processing for determining the recording condition. In the present exemplary embodiment, the gloss data specifies the gloss intensity, the gloss image clarity, the gloss saturation, and the gloss hue which express the glossy surface at each pixel. Integers from 1 to 100 are recorded on each gloss data for the areas on which the glossy surface is to be expressed, whereas "0" is recorded on all of the individual data included in the gloss data for the areas on which the glossy surface should not be expressed. Then, the recorded gloss data in the above format is acquired. In addition, the range and the format of the gloss data are not limited to the above examples, and fractional values from 0.0 to 1.0 may be assigned as the range of the gloss data. Further, all of the data in the format may include negative values for the areas on which the glossy surface should not be expressed. After the gloss data has been acquired, the processing proceeds to step S1002.

In step S1002, a correspondence relationship between the gloss data acquired in step S1001 and the recording condition is acquired. In the present exemplary embodiment, the recording condition indicates the ink type and the ink dot layout of the first ink 401 which are recorded on the target area. The correspondence relationship is previously created by printing and measuring the printed material under the above-described different recording conditions and stored in the data storage region (not illustrated). FIG. 11A is a table illustrating an example of the correspondence relationship. The correspondence relationship retains the gloss intensity, the gloss image clarity, the gloss saturation, and the gloss hue, each of which is included in the gloss data, and the ink type and the ink dot layout of the first ink 401 which corresponds to the gloss data. According to the example of the correspondence relationship of FIG. 11A, the ink type can be switched between two ink types, "Cyan" and "Red", while the ink dot layout can be switched between two layouts, "concentrated" and "dispersed" illustrated in FIGS. 9A and 9B, respectively. In addition, the ink types and the ink dot layouts are not limited to the above. "Yellow" and "Green" may be also provided as the ink types. Further, a plurality of patterns may be provided for the ink dot layouts according to the amount of dots overlapping each other. After the gloss data is received in step S1001, the correspondence relationship is acquired from the data storage region. Further, in the present exemplary embodiment, the correspondence relationship is stored previously. However, the exemplary embodiment is not limited to the above. For example, the correspondence relationship may be input by the user, or may be estimated based on the characteristics of the ink.

Figure 12:
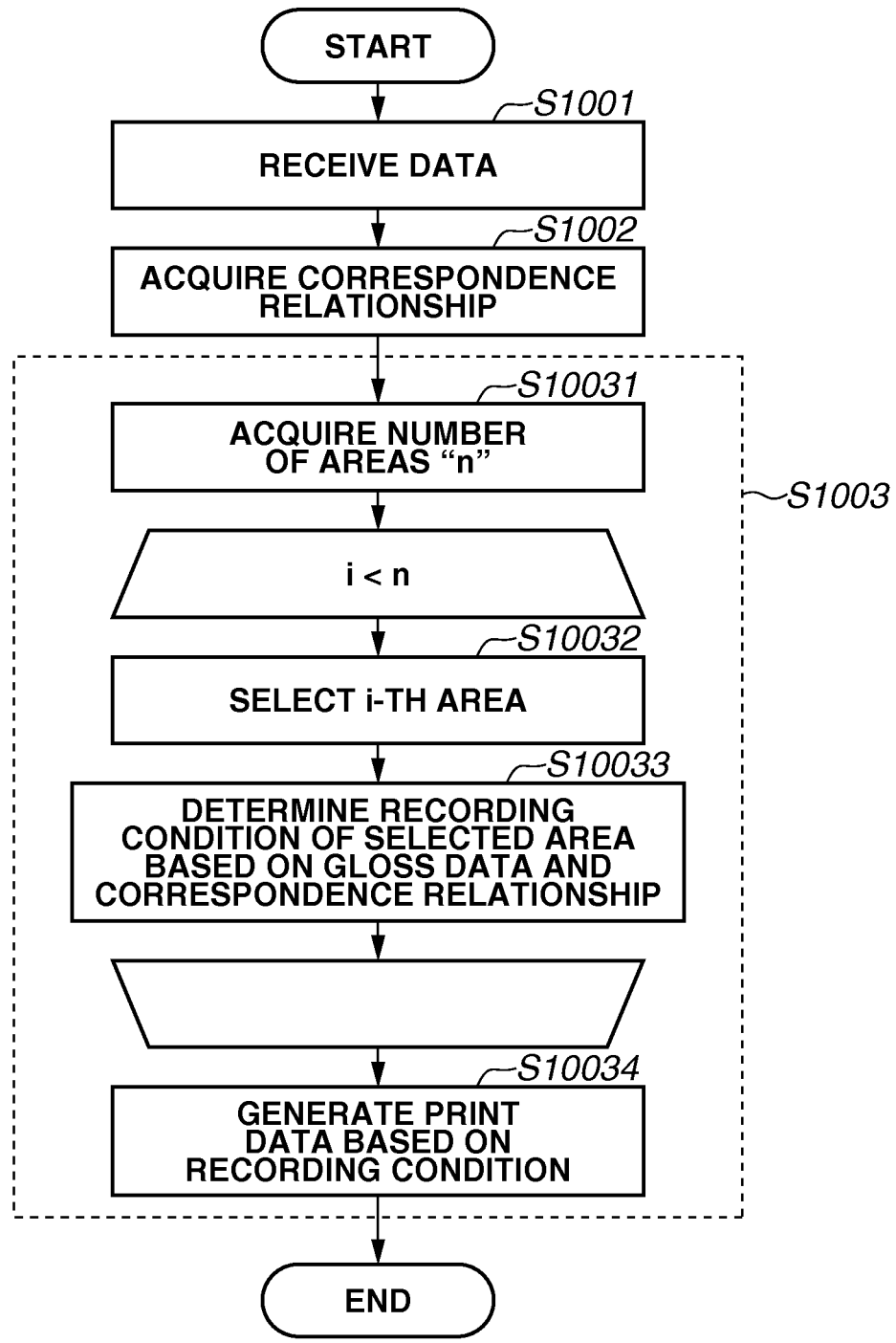
FIG. 12 is a flowchart illustrating details of the processing for determining the recording condition according to the second exemplary embodiment.

In step S1003, similar to the processing in step S102, after setting of the recording condition of each area, the print data is generated. FIG. 12 is a flowchart illustrating details of the processing executed in step S1003. The processing in steps S10031 and S10032 is similar to the processing executed in steps S1021 and S1022, respectively, and thus the description thereof will be omitted.

In step S10033, the recording condition is set to the processing target area based on the gloss data acquired in step S1001 and the correspondence relationship acquired in step S1002. In a case where each data of the gloss data at the processing target area is other than "0", the processing target area is determined to be the gloss area, and the recording condition of the first ink 401 is set according to the correspondence relationship. In a case where all of the gloss data at the processing target area is "0", the processing target area is determined to be the non-gloss area, and the recording condition in which the second ink 402 is not recorded is set based on the correspondence relationship. Further, in a case where the received gloss data is not provided in the correspondence relationship stored previously, the recording condition is determined by searching for the most similar correspondence relationship with respect to the gloss hue. In addition, the exemplary embodiment is not limited to the above. Instead of only using the gloss hue, the recording condition may be determined by searching for the correspondence relationship with respect to the closest gloss data, or the recording condition corresponding to the received gloss data may be calculated based on the known mapping method. Further, in a case where the recording condition corresponding to the received gloss data is not stored, generation of the print data may be suspended or stopped after notifying such condition to the user. Furthermore, in order to cope with the case where the recording condition corresponding to the input gloss data is not stored, a plurality of counter measures for coping with the above case may be stored, so that the processing can be changed according to the instruction of the user.

In step S10034, similar to the processing executed in step S1026, the print data is generated based on the recording condition of each area.

By realizing the above-described processing, the ink type and the ink dot layout of the first ink 401 is determined based on the gloss data indicating the gloss intensity, the gloss image clarity, the gloss saturation, and the gloss hue, so that it is possible to generate the print data in which the reproducible glossy surface is increased.

In addition, in the present exemplary embodiment, all of the gloss intensity, the gloss image clarity, the gloss saturation, and the gloss hue are input as the gloss data. However, the exemplary embodiment is not limited to the above. One or more than one piece of information from among the gloss intensity, the gloss image clarity, the gloss saturation, and the gloss hue may be input as the gloss data.

Further, in the present exemplary embodiment, a single ink type and a single ink dot layout are associated with a single area. However, the exemplary embodiment is not limited thereto. For example, as illustrated in FIG. 11B, a plurality of ink types or a plurality of ink dot layouts may be associated with a single area, or a plurality of ink types and a plurality of ink dot layouts may be associated with a single area. In a case where different ink types are to be expressed in a single area, print data may be generated such that the individual inks are applied on the uppermost surface.

In the above-described present exemplary embodiment, the ink which does not contain metallic powder is used as the first ink 401 to express the glossy surface while suppressing an increase in size of an image processing apparatus or an increase in cost caused by the use of the special glossy material. However, the special glossy material containing the metallic powder may also be used as the first ink 401. In this case, a difference in refractive indexes between the ink accumulated on the uppermost surface of the printed material and the air is greater than in a case where the ink without containing the metallic powder is used as the first ink 401, and thus ranges of the gloss intensity, the gloss saturation, and the gloss hue which is reproducible as the glossy surface may be increased. Therefore, the special glossy material may be used as the first ink 401 if it is desirable to further increase the expression range of the glossy surface.

Further, in the above-described present exemplary embodiment, image data such as the RGB image and the gloss data are received as the input data. However, the format of the input data is not limited to the above. For example, in a case where the user records a letter having the glossy surface on a printed material on which an image has already been recorded or the user prints a frame having the glossy surface, only the gloss data may be input as the input data because the user only executes printing of the print data having the glossy surface. In this case, the area on which an image is recorded with the special glossy material may be regarded as the gloss area. Accordingly, the information indicating the area on which an image is recorded with the special gloss material may be used as the gloss data.

Other Exemplary Embodiment

In the first and the second exemplary embodiments, generated print data is used as input data, and a multipath recording-system ink jet printer is described as the image recording apparatus for recording an image on the recording medium 401. However, the image recording apparatus is not limited to the above. The image recording apparatus may be a single-path recording system ink-jet printer, a photogravure printer, a flexographic printer, an offset printer, or an electro-photographic printer as long as the ink layer structure illustrated in FIG. 4A can be recorded thereby.

In the first exemplary embodiment, the binary data indicating presence or absence of the glossy surface is used as the gloss data, whereas in the second exemplary embodiment, the data indicating the gloss intensity, the gloss image clarity, the gloss saturation, and the gloss hue is used as the gloss data. However, the gloss data is not limited to the above. For example, as illustrated in FIG. 11C, materials, such as gold and copper, which the user wants to express as the glossy surface may be used as the gloss data, and then the print data is generated based on the correspondence relationship between the materials and the recording conditions. Further, the user may select a desired pattern from among the specific patterns of glossy surface.

In the first and the second exemplary embodiments, a single ink type such as a black or a gray ink is used as the second ink 402. However, the second ink 402 is not limited to the above. As with the case of the first ink 401, a plurality of ink types or a plurality of ink dot layouts may be employed for the second ink 402 in a single area.

Further, the present invention can be realized by the processing in which a program for realizing one or more functions of the above-described exemplary embodiment is supplied to a system or an apparatus via a network or a storage medium, and one or more processors of the computer of that system or the apparatus read and execute the program. Furthermore, the program may be executed by a single computer, or may be cooperatively executed by a plurality of computers. In addition, the present invention can be realized with a circuit (e.g., application specific integrated circuits (ASIC)) for realizing one or more functions.

Further, each of the exemplary embodiments can be combined as appropriate.

According to the present invention, a printed material having an appearance of a glossy surface of a metal or a pearl on the optional area thereof can be printed without causing an increase in size of an image processing apparatus or an increase in cost caused by the use of the special glossy material. Further, metallic luster can be reproduced in an enhanced manner by using the special glossy material.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100848, filed May 14, 2014, which is hereby incorporated by reference herein in its entirety.

What is claimed is:

1. An image processing apparatus for forming an image on a recording medium, the image processing apparatus comprising:
　　a setting unit configured to set whether gloss processing for reproducing a metallic luster is executed on a partial area of an image expressed by input image data, based on the input image data; and
　　a recording unit configured to record on the partial area a color material, which reduces an amount of an internal scattering light, corresponding to any of a complementary color of the partial area, black, or gray and to record thereon a color material for reproducing the color of the partial area in a case where a result of the setting unit indicates execution of the gloss processing,
　　wherein the internal scattering light scatters inside the color material for reproducing the color of the partial area.

2. The image processing apparatus according to claim 1, wherein the input image data includes gloss data indicating gloss of the image expressed by the input image data.

3. The image processing apparatus according to claim 2, wherein the image expressed by the input image data is an object.

4. The image processing apparatus according to claim 2, wherein the gloss data includes at least any one of gloss intensity, gloss image clarity, gloss saturation, and gloss hue.

5. The image processing apparatus according to claim 4, wherein the recording unit is configured to vary, in dependence on the gloss data, an ink-dot layout of the color material corresponding to any of a complementary color of the partial area, black, or gray or to vary an ink-dot layout of the color material for reproducing the color of the partial area.

6. The image processing apparatus according to claim 5, wherein the ink-dot layout is varied between a dispersed layout and a concentrated layout, the concentrated layout having a greater surface roughness than the dispersed layout.

7. The image processing apparatus according to claim 1, wherein the color material corresponding to any of the complementary color of the color material for reproducing the color of the partial area, black, and gray is a color material to emphasize color of surface reflected light arising from a bronzing phenomenon.

8. The image processing apparatus according to claim 1, wherein the recording unit executes recording by employing at least any one of an ink dot layout, a recording amount of ink, and number of times of scanning-recording operations, which have been previously associated with the input image data.

9. The image processing apparatus according to claim 1, configured to execute scanning-recording operations on a same area of a recording medium a plurality of times by using a same color material.

10. A non-transitory computer readable storage medium storing a program comprising steps of:

setting whether gloss processing for reproducing a metallic luster is executed on a partial area of an image expressed by input image data based on the input image data; and recording on the partial area a color material, which reduces an amount of an internal scattering light, corresponding to any of a complementary color of the partial area, black, and gray and recording thereon a color material for reproducing the color of the partial area in a case where a result of the setting unit indicates execution of the gloss processing, wherein the internal scattering light scatters inside the color material for reproducing the color of the partial area.

11. An image processing method for forming an image by executing scanning-recording operations on a same area of a recording medium a plurality of times by using a same color material, the image processing method comprising:

setting whether gloss processing for reproducing a metallic luster is executed on a partial area of an image expressed by input image data based on the input image data; and recording on the partial area a color material, which reduces an amount of an internal scattering light, corresponding to any of a complementary color of the partial area, black, and gray and recording thereon a color material for reproducing the color of the partial area in a case where a result of the setting unit indicates execution of the gloss processing, wherein the internal scattering light scatters inside the color material for reproducing the color of the partial area.

12. An image processing apparatus for forming an image on a recording medium, the image processing apparatus comprising:

a setting unit configured to set whether gloss processing for reproducing a metallic luster is executed on a partial area of an image expressed by input image data; and a recording unit configured to record on the partial area a color material, which reduces an amount of an internal scattering light, corresponding to any of a complementary color of the partial area, black, or gray and to record thereon a color material for reproducing the color of the partial area in a case where a result of the setting unit indicates execution of the gloss processing, wherein the internal scattering light scatters inside the color material for reproducing the color of the partial area.

13. A non-transitory computer readable storage medium storing a program comprising steps of:

setting whether gloss processing for reproducing a metallic luster is executed on a partial area of an image expressed by input image data; and recording on the partial area a color material, which reduces an amount of an internal scattering light, corresponding to any of a complementary color of the partial area, black, and gray and recording thereon a color material for reproducing the color of the partial area in a case where a result of the setting unit indicates execution of the gloss processing, wherein the internal scattering light scatters inside the color material for reproducing the color of the partial area.

14. An image processing method for forming an image by executing scanning-recording operations on a same area of a recording medium a plurality of times by using a same color material, the image processing method comprising:

setting whether gloss processing for reproducing a metallic luster is executed on a partial area of an image expressed by input image data; and recording on the partial area a color material, which reduces an amount of an internal scattering light, corresponding to any of a complementary color of the partial area, black, and gray and recording thereon a color material for reproducing the color of the partial area in a case where a result of the setting unit indicates execution of the gloss processing, wherein the internal scattering light scatters inside the color material for reproducing the color of the partial area.

* * * * *